United States Patent Office 3,174,417
Patented Mar. 23, 1965

3,174,417
MIRROR REFLEX CAMERA WITH BUILT-IN DEVICE FOR VIEWING THE IMAGE
Edgar Sauer, Stuttgart, and Werner Zink, Aich, Kreis Nurtingen, Germany, assignors to Zeiss Ikon Aktiengesellschaft, Stuttgart, Germany
Filed Oct. 17, 1961, Ser. No. 145,683
Claims priority, application Germany, Oct. 19, 1960, Z 8,309
5 Claims. (Cl. 95—49)

This invention relates to a mirror reflex camera provided with a built-in device for viewing the image projected by the photographic objective, which device may for instance consist of a penta roof edge prism.

In a mirror reflex camera which is provided with exchangeable attachments for the horizontal or vertical viewing of the finder image, it is known to arrange the optical member, such as a ground glass plate, serving for viewing the image projected by the photographic objective, exchangeably within the camera. In this known arrangement the mentioned optical member can only be removed from the camera and exchanged for other optical parts after the view finder attachment has been completely detached from the camera.

There are known other mirror reflex cameras in which the optical member for the production of the finder image is arranged in a mounting support associated with the roof edge prism or with the light tunnel. Also in this case the optical member for producing the finder image can only be removed, respectively exchanged, after the other viewing attachments have been taken off the camera.

It is an object of the invention to make possible an exchange of the optical member serving for the viewing of the finder image in mirror reflex cameras which usually have their devices for viewing the image either built in or fixedly attached. This problem is solved according to the invention in that the mentioned optical member for the viewing of the finder image is arranged in the camera in such a manner that it is accessible in itself, detachable and exchangeable. By such an arrangement the utilization scope of mirror reflex cameras is greatly expanded over such cameras having fixedly mounted devices for viewing the finder image.

The invention discloses a number of possibilites for employing various optical parts in exchange for the field lens which constitutes the optical member for reproducing the image and which is arranged in the image plane of the photographic objective of the camera. This optical member or field lens may be exchanged for a field lens provided with an indicator consisting of a ground glass ring and/or a split image range finder, or it may be exchanged for a field lens ground on one side only, or finally it may be exchanged for a field lens and an additional ground glass plate having a clear spot, preferably in connection with a scale and/or a reticle. As a matter of convenience, the field lenses and the ground glass plates may each be arranged individually exchangeable within the camera. The exchangeable field lenses, which may be built as Fresnel lenses, serve moreover as optical correcting members for adapting the view finder device to the different focal distances of the exchangeable objectives mounted on the camera.

The optical member for the reproduction of the image which may consist of several parts can be arranged within the camera in different ways. It is for instance possible to mount this optical member in a frame which upon release of latch may be removed from the camera and reinserted through the objective opening. The frame may also be arranged swingably within the camera whereby it comes to lie in its extended position in the immediate proximity of the objective opening, so that also in this case the optical member mounted in the frame may be taken hold of through the objective opening and be removed from the frame or be reinserted into the same, respectively.

If the objective opening is not accessible, then the optical member for the reproduction of the image has to be handled through a slot provided in the camera.

The invention will now be described in more detail with reference to the accompanying drawings, in which.

Figure 1:
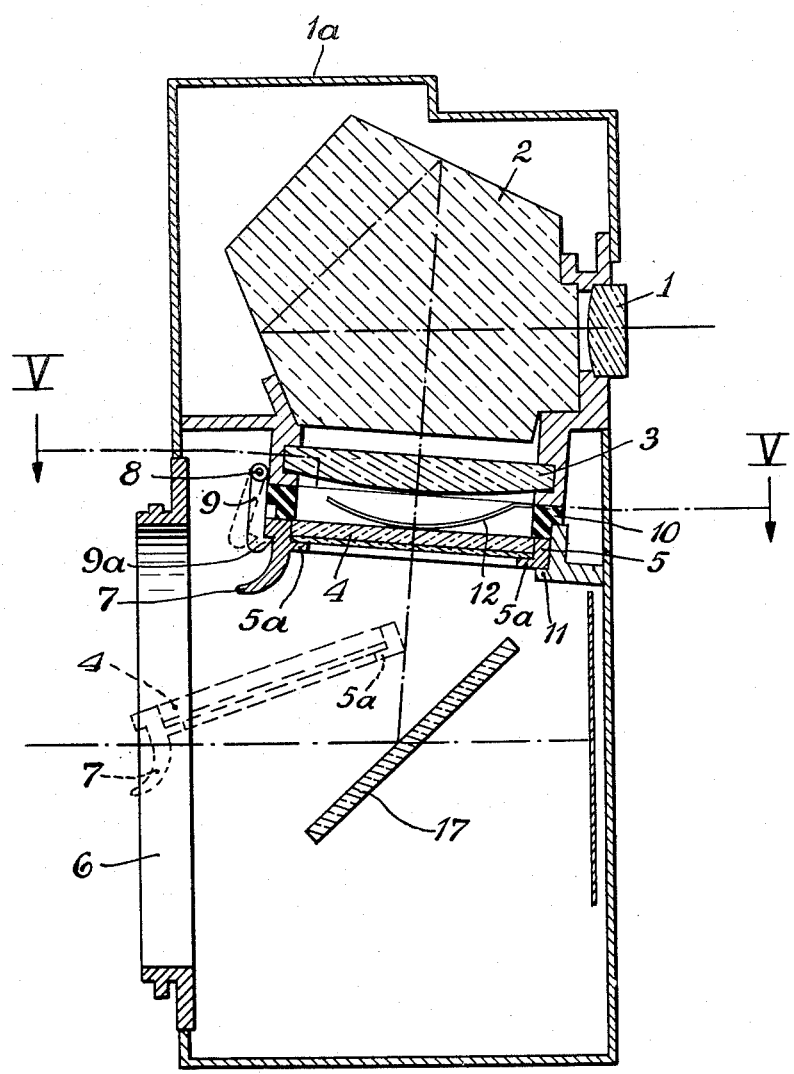
FIG. 1 is a diagrammatic side elevation view of a mirror reflex camera with a frame holding an optical member on which the finder image appears, which frame is removable through the objective opening in the front wall of the camera casing.

Referring to FIG. 1, a single lens mirror reflex camera is provided in the upper portion of the camera casing with a device for viewing the view finder image. This device consists of an ocular lens 1, a roof edge prism 2 and, if desired, an image field lens 3 for brightening up the image. These parts 1, 2 and 3 are fixedly mounted in the camera casing. Beneath the image field lens 3 and in the image plane of the not shown photographic objective is arranged the optical member 4 for the viewing of the image, which member for instance may consist of a ground glass plate and/or a field lens built like a Fresnel lens. This optical member 4 is mounted in a frame 5 which is provided with a handle 7 pointing toward the objective opening 6 of the camera. The frame 5 is held in its operative position by a latch 9 which under the action of a spring is pivoted about the axis of its mounting shaft 8, whereby the latch 9 presses the frame 5 against an abutment 11 on the wall of the camera casing. The upper side of the frame 5 engages a resilient seal 10 which seals off the open space between the prism 2, or the field lens 3 respectively, and the optical member 4 against the infiltration of dust or the like. The optical member 4 is yieldably pressed against the supporting area 5a of the frame 5 by leaf springs 12 engaging the opposed marginal portions of the member 4 and therewith is held in the image plane of the photographic objective which is arranged in the opening 6 of the camera.

For the removal of the optical member 4 which may show a vertical image, the latch 9 is pivoted outwardly or clockwise by actuating means attached to the shaft 8 outside the camera casing, and here not shown, into the position indicated in FIG. 1 by dashed lines, so that the frame 5 can be lifted by means of the handle 7 from its abutment 10, 11 and can be removed through the objective opening 6 of the camera. Subsequently, another frame of the same construction and carrying another optical member, showing for instance a horizontal image, may be inserted. It is advisable to use the same frame and to exchange merely the optical member 4.

For inserting the frame 5 into the camera the frame 5 is first pushed into the recess formed by the abutment 11 provided in the wall of the camera casing and is then pressed against the resilient seal 10 until the latch 9, which is under the action of a spring, with its nose 9a engages the leading edge of the frame and secures the entire frame 5 within the camera.

Figure 2:
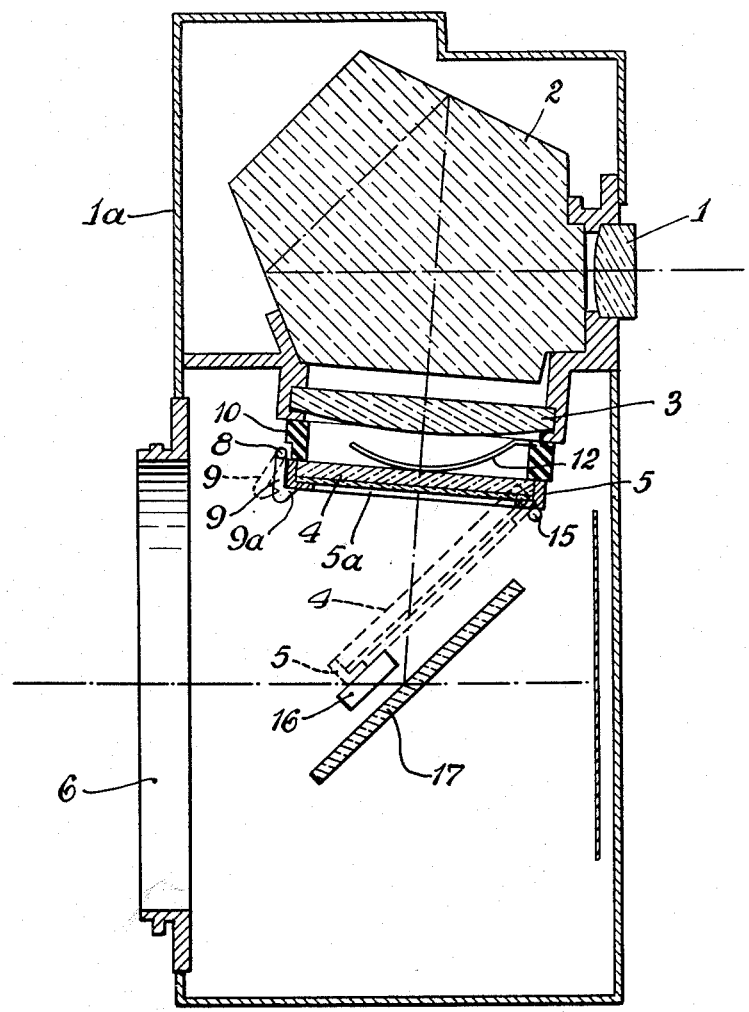
FIG. 2 is a similar view as FIG. 1, but illustrates a pivotally mounted frame for holding an exchangeable optical member on which the finder image appears.

In the embodiment illustrated in FIG. 2 the frame 5 carrying the optical member 4 is pivotally mounted about a shaft 15 within the camera casing. If the optical member 4 is to be exchanged, the latch 9 is pivoted outwardly or clockwise against the action of a spring about the axis 8, whereupon the frame 5 flaps counterclockwise downwardly about the axis of a shaft 15 and is held in a position approximately parallel to the surface of the reflex mirror 17 by a stop 16 so that the optical member 4 can now be lifted from the frame 5 and removed through the objective opening 6. After another optical member has been inserted into the frame 5, the latter is caused to move upwardly again until it, or the optical member 4, respectively, is stopped at the seal 10, whereupon the frame 5 again is locked in operative position by the latch 9. The upward movement of the frame 5, after the optical member therein has been exchanged, may be actuated from the outside by a manually operable handle attached to one end of the shaft 15. Also in this case the optical member 4 is pressed by leaf springs 12 against the bearing 5a provided in the frame 5 and thus is retained in the image plane of the photographic objective.

Figure 3:
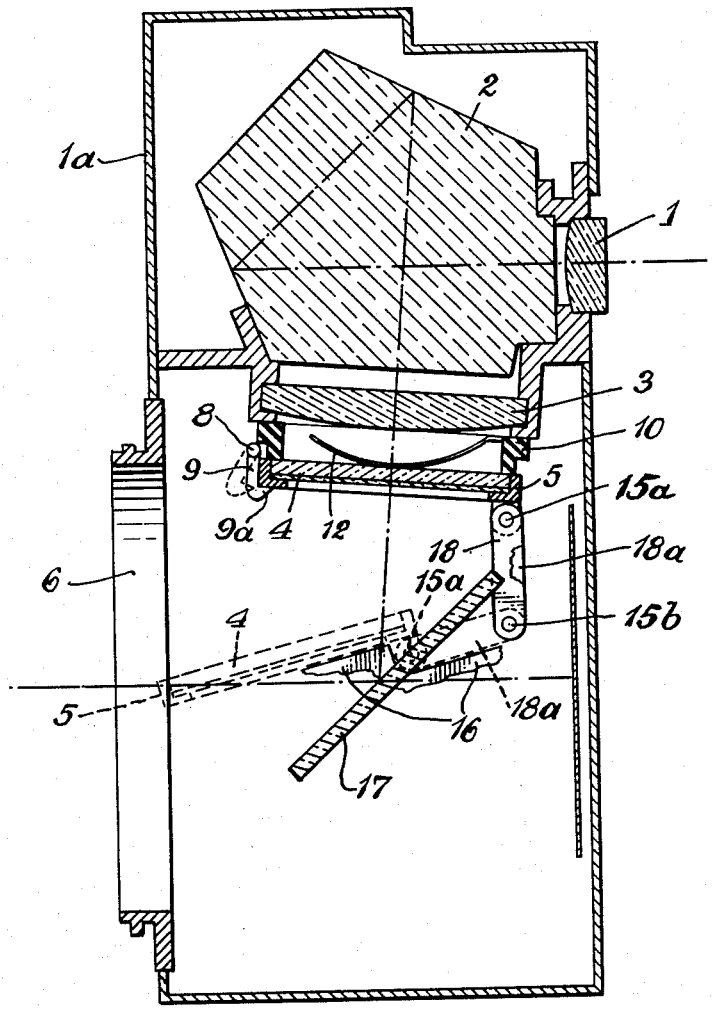
FIG. 3 is a similar view as FIG. 2, but shows a pivotally mounted frame supported by an additional lever, the frame again holding an exchangeable optical member on which the finder image appears.

Another embodiment of the invention is illustrated in FIG. 3. Here the frame 5 is pivoted about the axis of a shaft 15a and is connected with the camera casing by two parallel levers 18, 18a. The levers 18, 18a are connected by a pivot axis 15b to the camera casing. By this arrangement the total pivot radius of the frame 5 is increased so that the frame 5 in its extended pivoted position will be close to the objective opening 6, as indicated in dashed lines. Also in this embodiment the frame 5 and the intermediate linkage 18, 18a may be arrested in their pivoted position by means of stops 16 provided at the camera casing. The removal and the insertion, respectively, of the optical member 4 is considerably facilitated by this favorable position of the pivoted frame 5.

Figure 4:
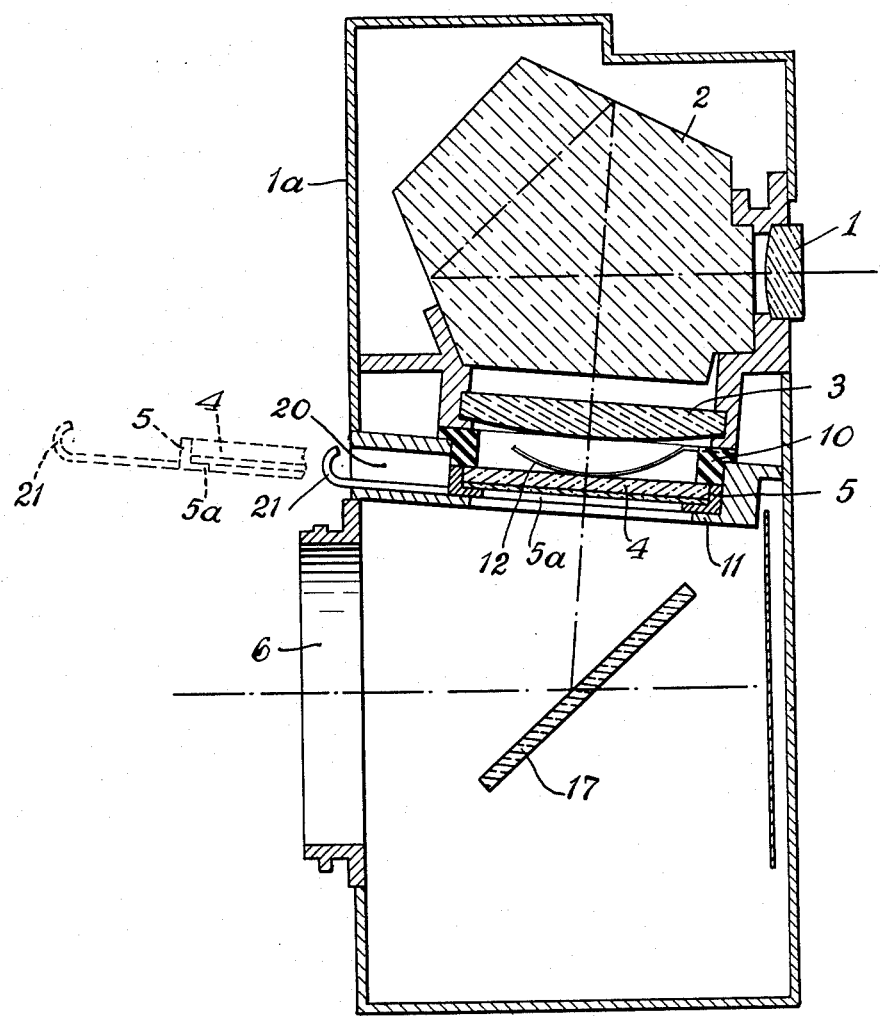
FIG. 4 illustrates a view similar to FIG. 1, in which the frame holding an optical member on which the finder image appears is slidably mounted in a slot provided in the camera casing.
Figure 5:
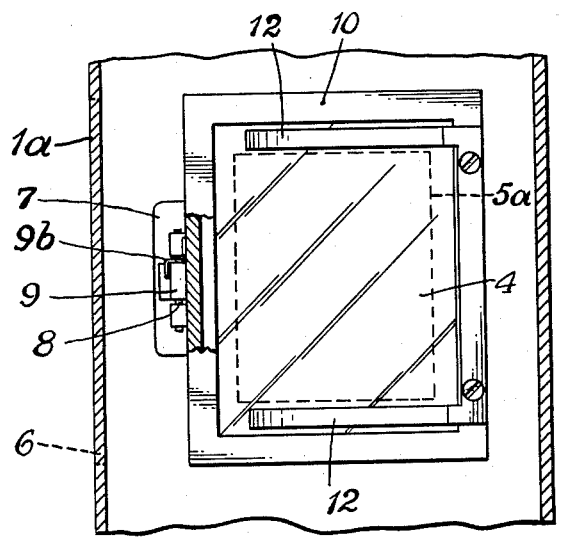
FIG. 5 illustrates diagrammatically a substantially horizontal section along the line V—V in FIG. 1.

The embodiments illustrated in the FIGS. 1 to 3 permit an exchange of the optical member 4 through the objective opening 6 arranged in the front wall 1a of the camera. If this is not possible, as for instance in mirror reflex cameras with fixedly mounted photographic objectives, then the optical member 4 has to be removed from the camera or inserted into the same, respectively, through a slot provided at the camera casing. Such an arrangement is illustrated in FIG. 4, in which the frame 5 carrying the optical member 4 can be pulled out from the front wall of the camera or reinserted into the same through a slot 20 which is arranged at the level of the image plane of the photographic objective. For this purpose the frame 5 is provided with a handle 21 protruding from the front wall of the camera. The position of the frame 5 is also here determined by the abutment 11 provided at the camera casing, whereby the optical member 4 is pressed by means of springs 12 against the supporting area 5a provided at the frame 5. The resilient seal arranged closely to the frame 5 or the optical member 4, respectively, again is designated with 10.

If the optical member for the viewing of the view finder image is to be exchanged, the entire frame 5 is pulled out of the camera by means of the handle 21 at least so far that the optical member can be removed from the frame and another one be inserted, whereupon the frame 5 by means of the handle 21 is pushed back into the slot 20 provided in the camera casing.

It is obvious that the optical member 4 may also be fixedly secured in the frame 5 and that each optical member may be given its own individual frame. The handle 21 may be connected with the frame either fixedly or detachably and for the purpose of removing or inserting the frame 5 the handle 21 may be coupled with the frame.

What we claim is:

1. In a mirror reflex camera having a viewer including a reflecting mirror and a roof edge prism permitting an observation of the image projected into the camera by the photographic objective, an optical member on which the image projected by the photographic objective is projected in a predetermined position, means for removably mounting said optical member in the image ray path between said mirror and roof edge prism in said camera for individual and optional removal and insertion, while said roof edge prism remains fixedly mounted in said camera, said means comprising a movably mounted frame in which said optical member is loosely inserted, an abutment in said camera for engaging said frame, a pivotally mounted latch for releasably locking said frame when engaging said abutment in a position in which said optical member is supported in its operative position adjacent said roof edge prism, and spring means in said camera engaging said optical member and urging it into engagement with said frame.

2. In a mirror reflex camera having a viewer including a reflecting mirror and a roof edge prism permitting an observation of the image projected into the camera by the photographic objective, an optical member on which the image projected by the photographic objective is projected in a predetermined position, means for mounting said optical member in said camera for individual removal and insertion, while said roof edge prism remains fixedly mounted in said camera, said means comprising a movably mounted frame in which said optical member is mounted, means for releasably locking said frame in a position in which said optical member is supported in its operative position, and stop means within said camera for arresting the frame in its inoperative position in which said optical member may be removed and inserted.

3. In a mirror reflex camera having a viewer including a reflecting mirror and a roof edge prism permitting an observation of the image projected into the camera by the photographic objective, an optical member on which the image projected by the photographic objective is projected in a predetermined position, means for mounting said optical member in said camera for individual removal and insertion, while said roof edge prism remains fixedly mounted in said camera, said means comprising a pivotally mounted frame in which said optical member is inserted, a pivotally mounted linkage attached with one of its ends to said frame and with the other end to said camera casing, and means for releasably locking said frame in a position in which said optical member is supported in its operative position.

4. In a mirror reflex camera having a camera casing with a view finder therein, including a reflecting mirror and a roof edge prism permitting an observation of the finder image projected into the camera by the photographic objective, an objective opening in the front wall of the camera, an optical member on which the image projected by the photographic objective is projected in a predetermined position, and means for mounting said optical member in said camera for individual removal and insertion through said objective opening while said roof edge prism remains fixedly mounted in said camera casing, said means comprising a pivotally mounted frame in which said optical member is inserted, a pivotally mounted linkage attached with one of its ends to said frame and with the other end to said camera casing, and means for releasably locking said frame in a position in which said optical member is supported in its operative position.

5. In a mirror reflex camera having a camera casing with a view finder therein, including a reflecting mirror and a roof edge prism permitting an observation of the finder image projected into the camera by the photographic objective, an objective opening in the front wall of the camera, an optical member on which the image projected by the photographic objective is projected in a predetermined position, means for mounting said optical member in said camera for individual removal and insertion through said objective opening while said roof edge prism remains fixedly mounted in said camera casing, said means comprising a pivotally mounted frame in which said optical member is inserted, a pivotally mounted linkage attached with one of its ends to said frame and with the other end to said camera casing, means for releasably locking said frame in a position in which said optical member is supported in its operative position, and stops within said camera casing for limiting the movement of said pivoted frame and linkage into a position near said objective opening for removal and insertion of said optical member.

References Cited by the Examiner

UNITED STATES PATENTS

| 1,339,319 | 5/20 | Chen | 95—49 X |
| 2,833,191 | 5/58 | Weiss | 95—49 |
| 2,887,019 | 5/59 | Dodin | 95—42 |

NORTON ANSHER, *Primary Examiner.*

JOHN M. HORAN, *Examiner.*